US012257199B2

(12) United States Patent
Kempter

(10) Patent No.: US 12,257,199 B2
(45) Date of Patent: *Mar. 25, 2025

(54) BATHTUB LIFT

(71) Applicant: Drive Medical GmbH & Co. KG, Isny (DE)

(72) Inventor: Robert Kempter, Isny (DE)

( * ) Notice: Subject to any disclaimer, the term of this patent is extended or adjusted under 35 U.S.C. 154(b) by 76 days.

This patent is subject to a terminal disclaimer.

(21) Appl. No.: 17/888,555

(22) Filed: Aug. 16, 2022

(65) Prior Publication Data

US 2022/0387237 A1 Dec. 8, 2022

Related U.S. Application Data

(62) Division of application No. 16/898,578, filed on Jun. 11, 2020, now Pat. No. 11,654,066.

(30) Foreign Application Priority Data

Jun. 13, 2019 (DE) ..................... 10 2019 116 171.1
Jun. 13, 2019 (DE) ..................... 10 2019 116 173.8

(51) Int. Cl.
*A61G 7/10* (2006.01)

(52) U.S. Cl.
CPC ......... *A61G 7/1003* (2013.01); *A61G 7/1059* (2013.01); *A61G 7/1088* (2013.01)

(58) Field of Classification Search
CPC ................ A61G 7/1003; A61G 7/1059; A61G 7/1088
See application file for complete search history.

(56) References Cited

U.S. PATENT DOCUMENTS

| | | | | |
|---|---|---|---|---|
| 3,624,666 A | 11/1971 | Higgins, Sr. | | |
| 4,255,823 A | 5/1981 | Boyer et al. | | |
| 7,802,326 B2 * | 9/2010 | Kempter | A61G 7/1074 | 4/560.1 |
| 11,654,066 B2 * | 5/2023 | Kempter | A61G 7/1059 | 4/565.1 |

FOREIGN PATENT DOCUMENTS

| | | |
|---|---|---|
| DE | 4124725 A1 | 1/1993 |
| DE | 4130323 A1 | 3/1993 |
| DE | 29704769 U1 | 6/1997 |
| DE | 19701591 A1 | 7/1998 |
| DE | 19717743 A1 | 10/1998 |
| DE | 19833384 A1 | 1/2000 |
| DE | 10140847 A1 | 3/2003 |
| DE | 202005011259 U1 | 11/2005 |
| DE | 102004035286 A1 | 2/2006 |
| DE | 102004030456 A1 | 3/2006 |

(Continued)

*Primary Examiner* — Erin Deery

(57) ABSTRACT

A bathtub lift (1) includes a floor plate (2), a seat plate (3) adjustable to vary the distance between the seat plate (3) and the floor plate (2), and a back plate (4) detachably arranged on the seat plate (3). The back plate (4) supports an adjustment device (5) driven by a drive (6) for adjusting the distance between the floor plate and the seat plate. A locking device (7) is configured to release the back plate (4). The back plate (4) is not arranged on the surface (8) of the seat plate (3) facing away from the floor plate (2), and a detaching of the floor plate (4) is only made possible in a floor-plate-side end position of the seat plate (3).

14 Claims, 5 Drawing Sheets

(56) References Cited

FOREIGN PATENT DOCUMENTS

| | | | | | |
|---|---|---|---|---|---|
| DE | 102007045952 | A1 | | 4/2009 | |
| EP | 0193730 | A2 | | 9/1986 | |
| EP | 0347652 | A2 | | 12/1989 | |
| EP | 0380621 | A1 | | 8/1990 | |
| EP | 0853936 | A2 | | 7/1998 | |
| EP | 3453372 | A1 | * | 3/2019 | ........... A61G 7/1003 |
| FR | 2804861 | A1 | | 8/2001 | |
| WO | 2008149122 | A2 | | 12/2008 | |

* cited by examiner

BATHTUB LIFT

This U.S. divisional patent application claims priority to U.S. patent application Ser. No. 16/898,578, the entire content of which is incorporated by reference in its entirety.

TECHNICAL FIELD

The present disclosure relates to a bathtub lift.

BACKGROUND

Bathtub lifts are used to also allow physically handicapped users to take a bath or facilitate such a bath by these users sitting on a seating surface of the bathtub raised at a comfortable height and, by means of this, being carefully lowered in the direction of the bathtub floor.

In its basic structure, a bathtub lift has, for this purpose, a floor plate, which usually rests on a tub floor spaced apart by suction feet. The floor plate supports a seat plate with a backrest attached to it, wherein a scissor system is arranged between the floor plate and the seat plate. The back plate is usually adjustable relative to the seat plate at certain angles to allow for a comfortable leaning of a user.

An adjustment device is arranged on the back plate, as is described in DE 10 2007 045 952 A1 for example, for adjusting the distance between the seat plate and the floor plate. Such an adjustment device comprises a drive and a force transmission to the floor plate, for example, in the form of a position- or length-variable rack, a linear motor or telescopic rod or further other devices. Via this force transmission, the seat plate is pressed down via the backrest away from the floor plate up to a maximum distance between the seat plate and the floor plate. A maximum distance approximately corresponds to the usual bathtub depth in such a way that a user can comfortably sit on the bathtub lift as if on a chair before moving in the direction of the tub floor to a minimum distance from seat plate to floor plate.

The back plates are usually detachable from the seat plate, in particular, at acute angles between the two so that a user body on the seat plate prevents accidental release. For example, bathtub lifts are known, in which the backrest must be folded onto the seat plate to be able to be removed from this. Usually, the seat plate on the seating-surface side supports coupling devices for connecting to the backrest. Some well-known back plates do not allow a user to lean back to a desirable extent.

Other bathtub lifts are known from prior art. From DE 198 33 384 A1, a bathtub lift is known, the locking device of which consists of detent nubs and corresponding detent recesses. From DE 197 01 591 A1, a bathtub lift with a telescopic rod arranged on the backrest and mounted on the floor plate is known, in which a locking device is arranged on the seat plate. From DE 101 40 847 A1, a bathtub lift with a lifting device with a drive device is known. From the DE 41 30 323 A1, a bathtub lift with a lockable backrest is known.

From the DE 10 2004 030 456 A1, an adjustment device with a rack is known, via which the distance between the back plate together with the seat plate and the floor plate can be varied. From the DE 41 24 725 C2 and the EP 0 380 621 B1, a bathtub lift is known, comprising two hydraulic cylinders arranged on a floor frame, which run diagonally to the rear that are connected to the cold-water tap of the bathtub and are operated by means of this. From the WO 2008/149122 A2, a bathtub lift is known with a scissor lifting system, in which the lower front ends of the scissor arms are guided in a rail, and a seat is known with wings and an attached backrest, on which a battery-operated actuator is arranged, in which a guide rod connected to a floor rack is guided and can be driven by the actuator.

If the seat plate is stressed in an uneven or non-centered manner in one of the above-mentioned bathtub lifts, major deformations caused by the centered rack due to the presence of only center stability can occur. This lack of stability on the sides of the bathtub lifts leads to reduced comfort and possible hazardous situations for the user.

SUMMARY

The present disclosure provides a user-friendly and safe bathtub lift.

The bathtub lift of the present disclosure comprises a floor plate, a seat plate adjustable to vary the distance between the seat plate and the floor plate, and a back plate detachably arranged on the seat plate, wherein the back plate supports a driven adjustment device for adjusting the distance between the floor plate and the seat plate with a drive by the back plate being movable relative to the seat plate, wherein a locking device is provided for releasing the back plate, which is not arranged on the surface of the seat plate facing away from the floor plate and a detaching of the floor plate is only made possible in a floor-plate-side end position of the seat plate.

Being of a great advantage, the invention allows both a comfortable use of the entire seat plate as a seating surface and for a completely non-hazardous removal of the back plate by an assisting person during the use of the bathtub lift since this can only be done in the deepest position, and therefore in a safe manner within the bathtub. After removing the back plate, thereby, the entire length of the bathtub behind the position of the bathtub lift as well as the back plate of the bathtub itself are available to the user; he can freely choose his seat position on the entire length of the seat plate without a locking device or a joint on this surface being able to hinder him in doing so. The removability of the back plate and thus the backrest only in a position of the seat plate near the floor is achievable in many ways according to the invention: For example, mechanically by means of a locking bolt, which mechanically unlocks by pivoting only in the nearest position of the seat plate via contact to the floor plate, mechanically by means of a release pin in the seat plate, which makes contact with the floor plate and moves linearly into a release position when lowering the seat plate, electronically via an approximation or contact sensor, which releases a locking system in a motorized manner and in many other ways.

In an embodiment of the invention, it is provided that the locking device comprises at least two positively locking components, the positive locking of which can be established and be detached by means of the adjustment device. Such a mechanically acting locking device is preferred due to the low level of design, motor and electronic requirements. Being of a great advantage, it uses the adjustment device already available for height adjustment of the seat plate and thus ensures that detachability can only take place in the position of the seat plate closest to the floor plate. The adjustment device, in particular, does not directly act on the positively locking elements, but its relative position to each other varies, in particular, by exerting a force onto the back plate or not doing so.

In a further embodiment of the invention, it is provided that a positively locking component is a locking bolt arranged on the seat plate, and another positively locking component is a passage opening arranged on the back plate for the locking bolt to be pushed through, wherein the adjustment device varies a relative position of the two positively locking parts towards each other. As already explained, this is a constructively simple and reliable embodiment, in which, in particular, by exerting force on the back plate, the position of the two positively locking parts can be varied with relation to each other, preferably, in such a way that a longitudinal axis of the locking bolt is either coaxial or non-coaxial to the passage opening.

If the locking bolt is linearly movable against a force parallel to the surface of the seat plate, a reliable guide is possible, being of a great advantage, as well as a simple arrangement within the material of the seat plate since its entire thickness is therefore available.

In an embodiment of the invention, it is provided that the seat plate and the back plate each have curved sliding surfaces with corresponding radii, wherein the sliding surface of the seat plate is longer than the sliding surface of the back plate. With this advantageous embodiment, an unlocking position of the two positively locking elements towards each other for a simultaneous variable joining position of the back plate and the seat plate is defined. According to the invention, the sliding surface of the seat plate has a certain distance to the longitudinal axis of the locking bolt, and the sliding surface of the back plate has a certain distance to the passage opening, wherein both distances are selected in such a way that the positively locking components are coaxial when the sliding surfaces make contact with other in a planar manner. In this position, the back plate can be coupled to or be decoupled from the seat plate, wherein the joining angle between the two can be freely selected by an assisting person within the scope of the circumferential length of the curved sliding surfaces. A varying in the position of the sliding surfaces to one another, for example, by increasing the distance of the back plate to the seat plate, as this occurs when actuating the adjustment device, locks the positively locking components since the coaxiality is eliminated, thereby being of a great advantage. In other words, the back plate according to the invention can be coupled to the seat plate within a large angular range, as long as the seat plate is located in its position closest to the floor plate, i.e. with an inoperative adjustment device.

In a further embodiment of the invention, it is provided that the seat plate comprises at least one stop for the back plate, in particular, a front stop. By a front stop, according to the invention, one that defines a lowest possible angle between the seat plate and back plate is understood, for example, 95°, 100° or 105°.

If the passage opening is arranged within an arm of the back plate, an arrangement of the locking device below the seating surface can be easily achieved, in particular, in the region of the thickness of the seat plate, since the arms grip around the seat plate accordingly.

In an embodiment of the invention, it is provided that the arm comprises an upward sliding surface for actuating the locking bolt. Being of a great advantage, this upward sliding surface allows for the back plate to be placed from above onto the seat plate, thereby automatically pressing in the locking bolt against a force, in particular, a spring force.

It is a great advantage if, in a further embodiment of the invention, it is provided that the adjustment device comprises at least one, preferably two position- or length-variable bodies, in particular, position-variable bodies designed as racks. Instead of the known one rack of the adjustment device, two racks or generally two position- or length-variable bodies have a clear advantage with regard to the stability of the bathtub lift. Since they press onto the floor plate at two separate points and no longer only at a central point, they distribute the weight force of the user onto the floor plate better. In particular, the force application points are closer to or near the suction feet of the floor plate so that the weight force is introduced into the floor plate more gently. A bending of the floor plate and, at worst, a punctual setting of the floor plate onto the tub floor are avoided and the risk of breaking the tub floor is eliminated.

This applies all the more since the racks are supported on the floor plate, in particular, being supported in a guided manner.

Ultimately, according to the invention, it is provided that the back plate can be arranged at an angle between 90° and 150°, in particular, between 100° and 140° to the seat plate.

Furthermore, the underlying object of the invention is achieved by means of a bathtub lift comprising a floor plate, a seat plate adjustable to vary the distance between the seat plate and the floor plate, a back plate detachably arranged on the seat plate, wherein the back plate supports a driven adjustment device for adjusting the distance between the floor plate and the seat plate, wherein the adjustment device comprises an electromotive drive with exactly one electric motor, wherein the adjustment device furthermore comprises at least two position-variable bodies designed as racks, wherein a transmission between the drive and the racks is provided with two or a plurality of toothed gears as gear drives in order to simultaneously drive the two racks uniformly. With great advantage, the invention has a particularly high stability and is particularly stable against tilting laterally. Basically, the stability of the bathtub lift depends on the adjustment device, wherein a stability in an extended position, i.e. in a position in which the distance between the floor plate and the seat plate is at a maximum, is particularly important. If the adjustment device comprises at least two position-variable bodies, instead of the usual one body, even at this extended position, the very high level of stability is maintained, which also does not lead to instability even in the case of a stressing the seat plate in a non-centered manner, in particular, stressing it on a single side. Thereby, the bodies continuously vary their relative position to the back plate. There is an effective length, namely one that leads to a relative varying in position from the seat to the floor plate.

In an embodiment of the invention, it is provided that the at least two position-variable bodies are arranged parallel to each other and/or are designed as identical parts and/or are arranged equidistantly to lateral edges of the back plate. A parallel and thus non-centered arrangement of the position-variable bodies leads to a particularly high level of stability since a single-sided stressing of the seating surface can be dissipated into the floor plate across a body arranged close to it independently of the side on which it occurs. For this purpose, production costs can be saved since fewer individual parts are to be produced overall. The equidistant arrangement of the position-variable bodies also serves a high stability of the bathtub lift as a whole.

In a further embodiment of the invention, it is provided that the position-variable bodies are supported on the floor plate, in particular, being supported in a guided manner. Thus, a shifting of a position-variable body in the direction of the floor plate or an extending of a length-variable body leads to a repulsion of the back plate and the associated seat plate from the floor plate and thus, to a raising of the seat plate. If the position-variable bodies are guided in a supporting manner for this purpose, a possible slipping of the position-variable bodies on the floor plate is avoided, thereby also avoiding damage to the bathtub lift.

In an embodiment of the invention, it is provided that the floor plate has a region in which the position-variable bodies are guided in a supporting manner, wherein the region is designed as a recess, a groove, a stop or an indentation. The region in the floor plate is used, as already explained above, to securely hold the position-variable bodies in the floor plate, in particular, with a stressed seat plate and thus, in the case of stressed position-variable bodies. This region is particularly simply designed as a stop, or as a recess, a groove or an indentation to allow for stability in a plurality of directions. According to the invention, the region always interacts with the position-variable body in such a way that the position-variable bod, particularly in the stressed state, cannot be removed without retracting by means of the drive or only by means of the force effects from the region, which are not usual during operation.

According to the invention, the position-variable bodies are designed as racks. Racks are particularly advantageous, as they are easy and cost-effective to produce, robust and not vulnerable to bathing water or other external influences, and they do not require lubrication. Thereby, when using racks, it is not mandatory to shield them from the environment in a waterproof manner. For this purpose, it is particularly advantageous if the racks are made of a plastic.

According to the invention, it is provided that a transmission between the one drive and the at least two racks is provided, in particular, two or a plurality of gears as gear drives. The transmission makes it possible to drive the at least two racks simultaneously and uniformly. Also, only one drive is necessary, which drives all racks via the transmission. If more than two racks are provided, correspondingly, a plurality of gears are needed, which transmit the driving force of the drive to all position- or length-variable bodies. The transmission can also comprise a plurality of toothed gears and/or toothed gears with different sizes, by means of which a force transmission is controlled in such a way that a drive speed results from the drive in a drive speed throttled by the transmission on the racks.

According to the invention, it is provided that the drive is precisely an electric motor. An electric motor is a particularly cost-effective alternative, which also enables the bathtub lift to operate as quietly and constantly as possible.

In a further embodiment of the invention, it is provided that a scissor system with scissor arms is provided between the floor plate and the seat plate. Such a scissor system increases the stability of the bathtub lift, in particular, in an application in which two pairs of scissors are arranged on the outer sides of the floor plate and the seat plate. Thus, in addition to the position-variable bodies, the scissor system can already cause an increased lateral stability, but also a stability in the direction of the back plate or repelling away from this. For this purpose, the scissor system represents a particularly simple and cost-effective system, which enables and supports a varying of position between the floor and the seat plate.

In an embodiment of the invention, it is provided that the scissor arms are movably guided in guides arranged on the floor plate and/or the seat plate, wherein, in particular, the identically orientated ends of two scissor arms horizontally spaced apart from each other are designed to be connected to one another by a rotatably mounted shaft. Due to the guides, an uncontrolled shearing of the scissor arms and a twisting of the seat plate relative to the floor plate are prevented. For this purpose, the connection of two scissor arms horizontally spaced apart from each other also represents a further stabilization of the bathtub lift against uncontrolled shearing and twisting.

In further embodiment of the invention, it is provided that the guides are each formed as a rack, and the shaft comprises a toothing in the region of a shaft end, in particular, a toothed gear. Due to the interlocking toothing, the scissor arms are resistant to undesirable rolling, for example, due to material deformations, but also to a certain extent against displacements in the direction vertical to the shearing direction. This leads to a positively locking, shift-proof and rigid guide of the scissor arms in the guides; a misalignment of the seat plate is avoided, thereby being of a great advantage.

In an embodiment of the invention, it is provided that either the ends of the scissor arms rest on the floor plate and/or the seat plate, in particular, on its side directed towards the floor plate and are movably mounted on this while the shaft with the toothed gears only engages into the racks but does not rest on these, or wherein at least one scroll wheel is provided for the at least one toothed gear respectively, wherein the scroll wheel is connected to the shaft in a torque-proof manner, wherein the scroll wheel is designed to be able to roll directly on the floor plate or the seat plate or in a guide groove incorporated into it. This ensures a longevity of the guide and the scissor system, since the toothing, which tends to be more vulnerable, does not have to support the weight of a user, but rather this is supported by a scroll wheel or the scissor arms themselves in addition to position- or length-variable bodies, while, simultaneously, a controlled and guided rolling and extending/retracing of the scissor arms is possible due to the guide and the interlocking toothing.

The invention is described in a preferred embodiment with reference to the following figures in an exemplary manner, wherein further advantageous details can be found in the drawings. Identical parts are provided with same reference numbers.

DETAILED DESCRIPTION OF THE DRAWINGS

Figure 1:
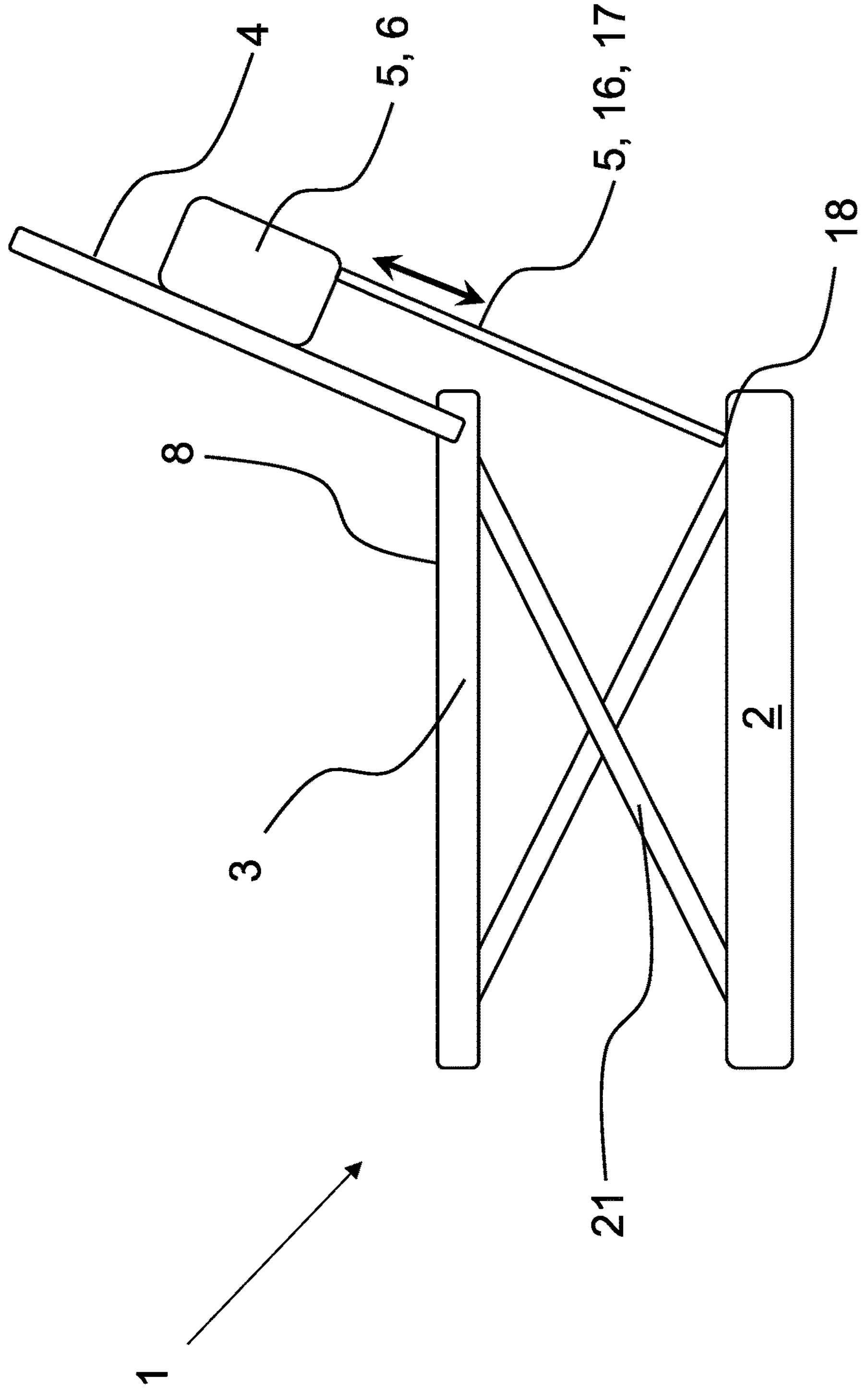
FIG. 1 shows a schematic view of a bathtub lift according to the present disclosure.

FIG. 1 shows a schematic view of a bathtub lift 1 according to the invention. The bathtub lift 1 essentially consists of a floor plate 2, which, in case of use, rests on the bathtub floor, or is spaced apart from it by means of feet, a seat plate 3 for a user, a scissor system 21 for the most stable force transmission from the used seat plate 3 to the floor plate 2, and a back plate 4, which supports a driven adjustment device 5. This adjustment device 5 is formed by a drive 6 either motorically, in particular, electromotively driven and causes a particularly vertical adjustment of the seat plate 3 relative to the floor plate 2. According to the invention, the adjustment device 5 either acts on the scissor system 21 or on the floor plate 2, in particular, on the floor plate 2 by means of a position- or length-variable body 16. By moving or extending the position- or length-variable bodies 16—for example, as a linear motor or a rack 17—along the double arrow, it varies the distance between floor plate 2 and the seat plate 3. In a retracted state of the position- or length-variable body 16, the seat plate 3 is in a position close to the floor plate; in extended state, it is in a position far away from the floor plate, wherein the position- or length-variable body 16 applies force onto the floor plate 2 in a contacting manner. For extending and retracting of the position- or length-variable body 16 in a more stable manner, a region 18 is provided in the floor plate 2, into which one end of the position- or length-variable body 16 engages and is therefore secured against slipping. The region 18 may be formed according to the invention as a recess, a groove, a stop or an indentation. According to the invention, the seat plate 3 is flat and ergonomically designed to the furthest extent possible on the upper side facing away from the floor plate 2—of the seating surface 8—so that both sitting as well as lying on the seat plate 3 is possible for the user without loss of comfort. According to the invention, no elevation is provided on this side, as it is provided in prior art for connection with the back plate 4. For this purpose, according to the invention, the back plate 4 is arranged on the seat plate 3 in a detachable manner and can be pivoted towards this.

FIG. 2 shows a first embodiment of the invention in four sub-figures.

Figure 2B:
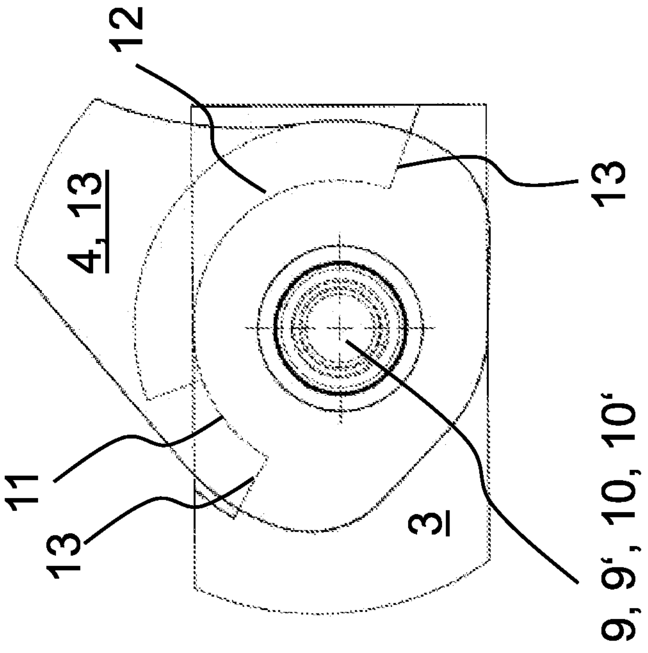
FIGS. 2*a*, 2*b*, 2*c*, and 2*d* show a first embodiment of the present disclosure.
Figure 2A:
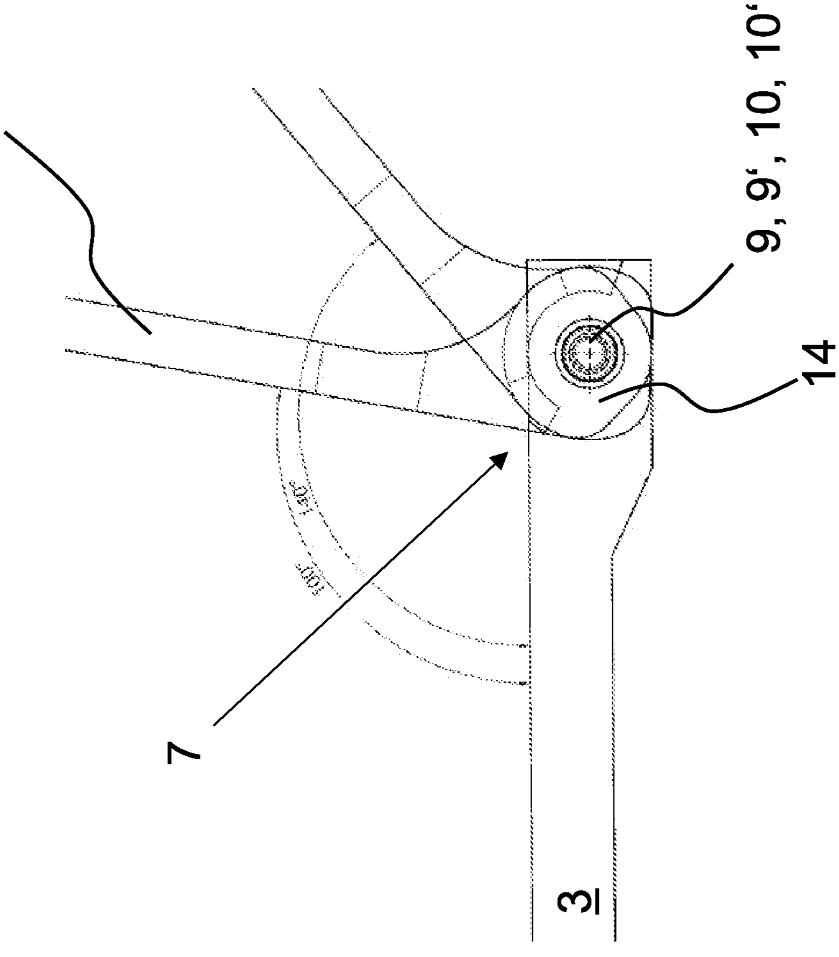

In FIG. 2*a*, in schematic side view, a seat plate 3 with an articulated back plate 4 in two angular positions towards the seat plate 3 is shown. The surface 8 forms the seating surface, which is smooth, flat or ergonomically shaped. The locking device 7 can be recognized, which is arranged on the side in this exemplary embodiment so that the back plate 4 grips around the seat plate 3 with two arms 14. Although this arrangement is preferred, an arrangement of the locking device 7 inside or below the seat plate 3 would also be according to the invention. A locking bolt 9' as positively locking part 9 and a passage opening 10' as a positively locking part 10 can be recognized, which are each part of the locking device 7. This position is shown in FIG. 2*b* more precisely.

In FIG. 2*b*, the coaxial arrangement of locking bolts 9' and passage opening 10' can be recognized. In this arrangement, the locking device 7 can be unlocked by pressing the locking bolt 9' against a force in the direction of the seat plate 3, whereby the back plate 4 can be removed. The shown position corresponds to a position of the seat plate 3 that is the closest to the floor plate with a retracted rack, or with a rack in a position, in which it does not exert any more force onto to the floor plate.

Two stops 13 as well as a curved sliding surface 11 of the seat plate 3 and a correspondingly curved sliding surface 12 of the back plate 4 can be recognized. A position of the back plate 4 is shown, in which this with the seat plate 3 encloses a maximum obtuse angle, in particular, 140°. The front stop 13 limits the lower limit of the angle, in particular, to 100°. With great advantage, the invention thus allows for a front stop 13 that increases the stability of the device. The back plate 4 with the seat plate 3 is connectable and detachable within this angular range. An assisting person therefore does not have to look for a certain angular position, thereby being of a great advantage, but rather an approximate angular position is sufficient to connect the two parts or to detach them from one another.

Figure 2D:
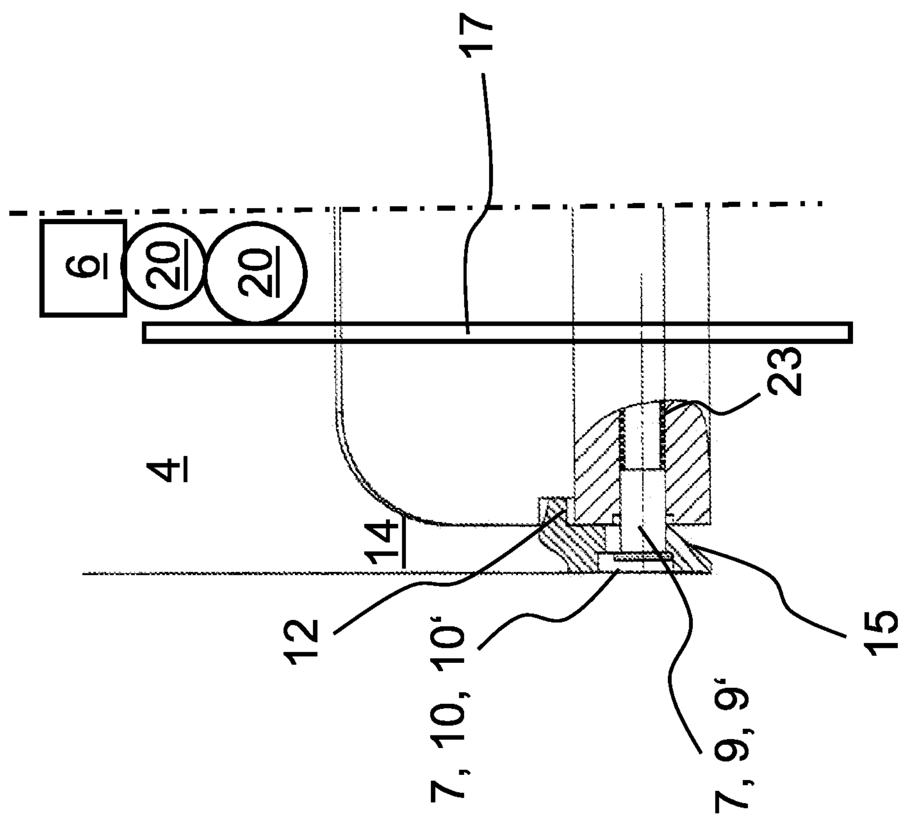
Figure 2C:
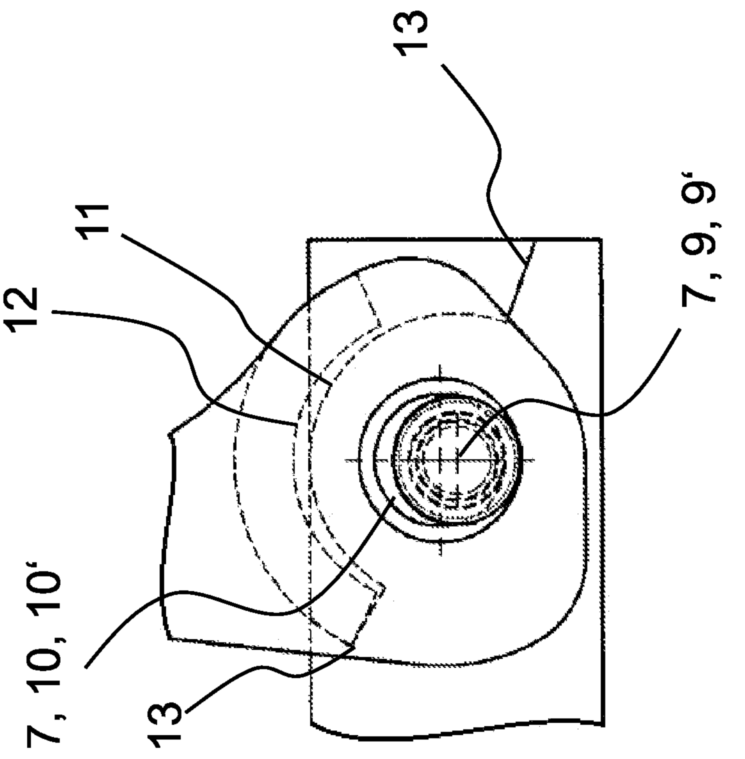

FIG. 2*c* shows the locked position in a detailed view. This position is assumed automatically as soon as the adjustment device removes the seat plate 3 from the floor plate, i.e. having raised it. The seat plate 3 is pulled up from the back plate 4, which for its part, in turn, supports the adjustment device 5 provided with a drive 6, by means of which pressure is applied onto the floor plate via the extending rack 17 (see FIG. 1). According to the invention, the passage opening 10' is designed with two axial sections with different radius, wherein the smaller radius is also greater than the radius of the locking bolt 9'. This results in a radial play of the locking bolt 9' in the passage opening 10' so that the back plate 4 can be lifted or removed from the seat plate 3 in general in proportion to this play. This can also be recognized by the distance between the two sliding surfaces 11, 12. In other words, a removal of the back plate 4 is only possible if the seat plate 3 is arranged as close as possible on the floor plate so a user is already in a bathtub and is secured by the bathtub walls. This also means that the seat plate 3 is pulled up to the locking bolt 9', which are therefore dimensioned accordingly. FIG. 2*d* shows a partially sectioned rear view of the device according to the invention in the region of the connection of the back plate 4 and the seat plate 3.

The radially stepped axial progression of the passage opening 10' with a radially larger, outer and a radially smaller inner axial section can be recognized. Both sections are larger in diameter than the locking bolt 9', which is, in turn, greater in diameter at its outer end than at its inner end. This embodiment of the passage opening 10' allows for the locking bolt 9' to be pressed and moved into a locked position, as is shown here. Furthermore, the locking bolt 9' in the seat plate 3 received in a bore hole as well as a spring 23 can be recognized, in particular a spiral spring, which acts on the locking bolt 9' shown and the locking bolt 9' can be brought into its withdrawn release position against its force. Instead of the spring 23 shown, any other elastic body is also according to the invention, for example, an elastomer body.

In an alternative embodiment (not shown), the locking bolt 9' is designed to be central, in particular however, designed to be retractable at the push of a button. The retraction can be performed by an electric motor or also, for example, mechanically via an articulated rod or the like. This has the advantage that direct access to the locking device 7 located in the bathtub is not required; a reaching into the bath water by the assisting person is avoided, thereby being of a great advantage.

An upward sliding surface 15 is arranged at the lower end of an arm 14 of the back plate 4, which upward sliding surface 15 causes a pressing in of the locking bolt 9' in the case of coupling the back plate 4 to the seat plate 3 automatically. When inserting the back plate 4 from above, the locking bolt 9' is pressed in through the upward sliding surface 15 and jumps back into a position locking both plates together as soon as the back plate 4 is pushed onto the seat plate 3 so that the passage opening 10' is above the locking bolt 9'.

A rack 17, a drive 6 as well as toothed gears 20 arranged in between are shown, which are used, on the one hand, as a transmission and, on the other hand, as a force transmission from the drive 6 to the rack 17. Being of a particularly great advantage, in this embodiment, two racks 17 are provided so that, due to their contact points spaced apart from each other on the floor plate near the feet, a particularly stable bathtub lift with maximum usage comfort results.

Figure 3:
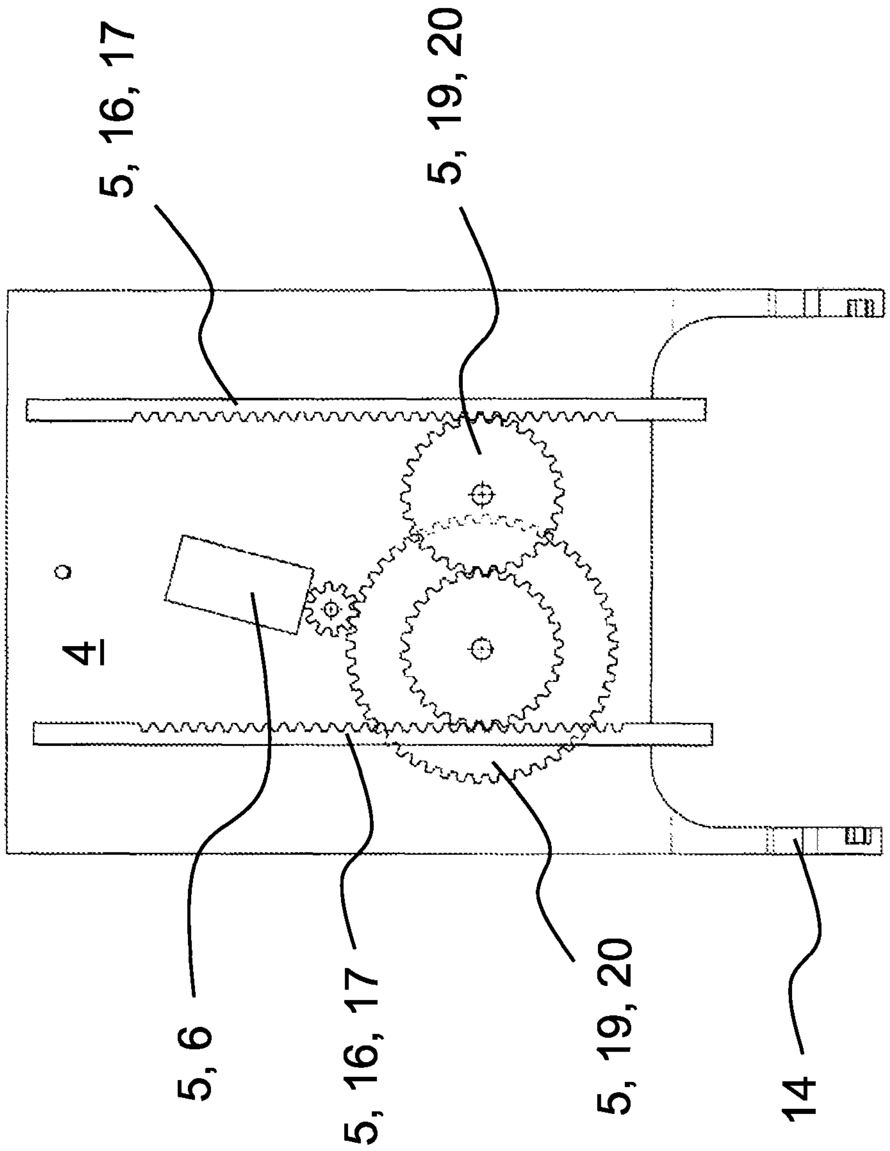
FIG. 3 shows a rear view of the back plate with an adjustment device.

FIG. 3 shows a schematic view of an adjustment device 5 according to the invention. The adjustment device 5 is arranged on a side of the back plate 4 facing the user so that a user can lean on the back plate 4 without obstructing the adjustment device 5 and having to suffer loss of comfort. The adjustment device 5 comprises two position- or length-variable bodies 16 and a drive 6. The drive 6 can be motorized, in particular, electromotively, or be a manualdrive system. The position- or length-variable bodies 16 are formed in the exemplary embodiment shown as racks 17, wherein the two racks 17 are equally formed in particular and are arranged in parallel to one another. For this purpose, these are arranged equidistantly to the outer sides of the back plates 4. By means of the drive 6, the bodies 16 can be varied in their position at least relative to the back plate 4. The racks 17 designed to be variably positionable via toothed gears 20 by means of the drive 6. For a uniform varying of position of both racks 17, a transmission 19 is provided, which interacts with the drive 6 and the racks 17 in the form of a plurality of toothed gears 20 in such a way that the one drive 6 drives the two racks 17 uniformly. This is solved in the exemplary embodiment shown in that the drive 6 drives a small toothed gear 20, which is effectively engages into a large toothed gear 20 in order to enable a particularly efficient force and speed transmission. A first toothed gear 20 is connected to the large toothed gear 20 in a torque-proof manner, in particular, manufactured as a single piece with it, which engages into one of the racks 17. A second toothed gear 20 engages into a first toothed gear 20, which rotates in an opposing manner towards the first toothed gear 20 and, in this way, the second rack 17 drives the first rack 17 to the same extent as the first toothed gear 20.

The provision of two non-centered racks 17 instead of a single, central position- or length-variable body 16, in more difficult drive situations, has the advantage of a better distribution of the load arranged on the seat plate (not shown) onto the floor plate (also not shown) so that, on the one hand, the risk of a bending the floor plate—possibly up to the tub floor—is minimized and, on the other hand, the force application results closer to the tub-side feet of the floor plate. Simultaneously, the individual racks may have narrower dimensions than in the case of a single rack 17. Instead of the racks 17 shown in this exemplary embodiment, any other embodiment is also according to the invention that has two components adjustable to vary their effective length, for example, telescopic tubes, linear drives and the like.

Figure 4B:
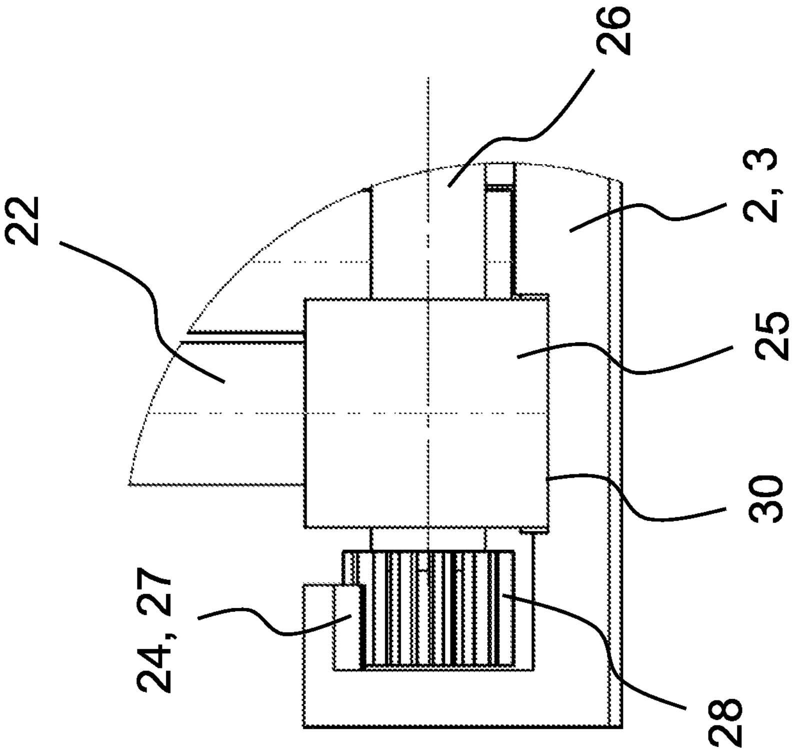
FIGS. 4*a* and 4*b* show an embodiment of a guide according to the present disclosure.
Figure 4A:
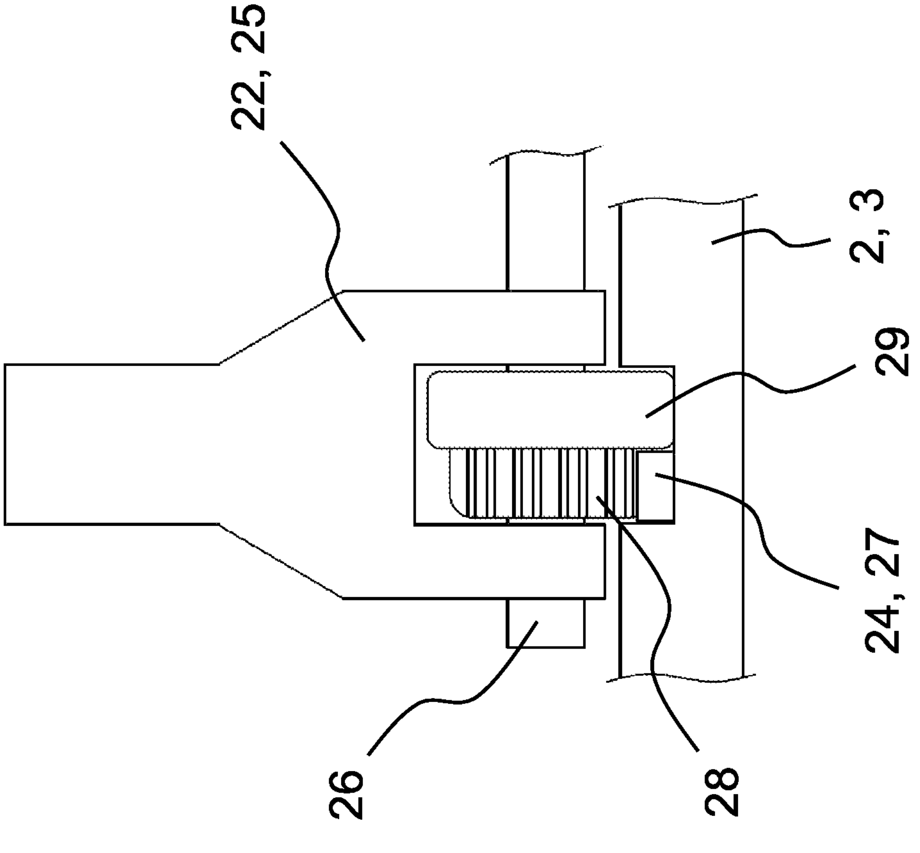

FIG. 4 respectively shows an embodiment of a guide 24 according to the invention. The first embodiment shown in FIG. 4*a* provides a groove formed within the floor plate 2 and/or seat plate 3, in which the guide 24 is arranged. In this embodiment, the guide 24 is designed as rack 27, in which a toothed gear 28 engages, which is connected to a shaft 26 rotatably mounted on the scissor arms 22 in a torque-proof manner. The shaft 26 is rotatably mounted, in particular, at the end 25 of the scissor arm 22. A scroll wheel 29 is also rigidly connected to the shaft 26, which roller is guided and/or rolls in a groove within the floor plate 2 and/or seat plate 3. Thereby, the toothed gear 28 and the scroll wheel 29 can be connected to each other. According to the invention, the load with the weight force of a user is always on the scroll wheel 29, while the toothed gear 28 only engages into the rack 27 to the extent that an orderly rolling and thereby an orderly shearing together and away of the scissor arms 22 is possible. For this purpose, the end 25 is fork-shaped so that the toothed gear 28 and the scroll wheel 29 can be arranged between the prongs of the fork-shaped end 25. With this advantageous embodiment, the stability of the bathtub lift according to the invention is again significantly increased since the scissor arms 22 are each guided in the racks 27 and can only be moved synchronously via the shaft 26. Simultaneously, the load transfer of the scissor arms 22 is carried out with advantage via the scroll wheel 29 or the groove in such a way that the stability is increased overall. Being of particular advantage, the invention provides this combination of a guide 24 and a toothed gear 28, and that being both in the floor as well as in the seat plate, thus at each end of the scissor arms 22 regardless of whether they point to the floor plate or seat plate.

FIG. 4*b* shows an embodiment in which a guide groove 30 is provided in the floor plate 2 and/or seat plate 3, in which an end 25 of a scissor arm 22 is guided in a movable manner. The guide groove 30 is designed in such a way that the end 25 of the scissor arm 22 can only be shifted linearly at an axis. For this purpose, the floor plate 2 and/or seat plate 3 has/have a handle, at the protruding end of which the guide 24 is arranged in the form of a rack 27. In this rack 27, toothed gear 28 engages, which is arranged on a rotatable shaft 26 arranged on the scissor arms 22. Also, the guide 24 can be arranged directly on the floor plate 2 or the seat plate 3, meaning the floor plate 2 or seat plate 3 have no handle. In this case, according to the invention, all mentioned alternatives have in common that the toothed gear 28 is not loaded with the weight force of the user to the furthest extent possible, but together with the rack 27, is only used to guide 24 and thus to shear the scissor arms 22 together and apart.

The following reference numerals are part of the description:

1 bathtub lift
2 floor plate
3 seat plate
4 back plate
5 adjustment device
6 drive
7 locking device
8 surface
9 positively locking part
9' locking bolt
10 positively locking part
10' passage opening
11 seat plate sliding surface
12 back plate sliding surface
13 stop
14 arm
15 upward sliding surface
16 position- or length-variable body
17 rack
18 region
19 transmission
20 toothed gear
21 scissor system
22 scissor arm
23 spring
24 guide
25 end
26 shaft
27 rack
28 toothed gear
29 scroll wheel
30 guide groove

What is claimed is:

1. A bathtub lift comprising:
- a floor plate;
- a seat plate;
- a back plate detachably arranged on the seat plate and configured to detach from the seat plate only while the seat plate is in a first end position closest to the floor plate; and
- a driven adjustment device supported on the back plate and configured for adjusting a spacing between the floor plate and the seat plate, wherein the seat plate is configured to move relative to the floor plate between the first end position closest to the floor plate and a second end position, in which the seat plate is furthest from the floor plate, wherein the driven adjustment device includes:

an electric motor;

at least two position-variable racks; and a plurality of toothed gears operably coupled between the electric motor and the at least two position-variable racks and configured to drive the movement of the seat plate along the at least two position-variable racks between the first and second end positions, wherein the at least two position-variable racks are arranged parallel to one another, designed as identical parts, and/or are equidistant to lateral edges of the back plate.

2. The bathtub lift according to claim 1, wherein the position-variable racks are supported on the floor plate.

3. The bathtub lift according to claim 2, wherein the position-variable racks are supported in a guided manner.

4. The bathtub lift according to claim 1, wherein the floor plate has a region, in which the position-variable racks are supported in a guided manner, wherein the region is at least one of a recess, a groove, a stop or an indentation.

5. The bathtub lift according to claim 1, further comprising a scissor system including:

a first pair of scissor arms provided between the floor plate and the seat plate on a first side of the floor plate and the seat plate; and a second pair of scissor arms provided between the floor plate and the seat plate on an opposite, second side of the floor plate and the seat plate.

6. The bathtub lift according to claim 5, wherein each of the first and second pairs of scissor arms are moveably guided in respective first and second guides arranged on the floor plate and/or the seat plate.

7. The bathtub lift according to claim 6, further comprising a shaft rotatably mounted between the first and second pairs of scissor arms, wherein a first arm of the first pair of scissor arms and a first arm of the second pair of scissor arms are horizontally spaced away from each other between the first and second sides and connected to each other by the shaft.

8. The bathtub lift according to claim 7, wherein each of the first and second guides includes a rack and the shaft comprises a first toothing at a first end of the shaft operably coupled to the rack of the first guide, and a second toothing at a second end of the shaft operably coupled to the rack of the second guide.

9. The bathtub lift according to claim 8, wherein the first and second toothing are first and second toothed gears.

10. The bathtub lift according to claim 9, wherein the first arm of the first pair of scissor arms and the first arm of the second pair of scissor arms each include an end that is supported on the floor plate and moveably mounted on the floor plate, and the first and second toothed gears of the shaft engage into the racks, the bathtub lift further comprising first and second scroll wheels connected to the respective first and second ends of the shaft in a torque-proof manner, wherein the first and second scroll wheels are configured to roll directly on the floor plate or in a respective guide groove of the first and second guides such that the first and second scroll wheels bear a weight of the first and second pairs of scissor arms, the seat plate, and the back plate.

11. A bathtub lift, comprising:

a floor plate having a first side defining a first guide groove along a length of the floor plate, and an opposite second side defining a second guide groove along the length of the floor plate;

a first rack positioned in the first guide groove;

a second rack positioned in the second guide groove;

a seat plate coupled to the floor plate and configured to move relative to the floor plate in a vertical direction between a first end position and a second end position;

a back plate supported on the seat plate;

a driven adjustment device configured for moving the seat plate in the vertical direction relative to the floor plate between the first and second end positions;

a first pair of scissor arms positioned between the floor plate and the seat plate, the first pair of scissor arms having a first arm having an end rotatably supporting a first scroll wheel and a first gear, wherein the first gear is operably coupled to the first rack and the first scroll wheel is engaged with the first guide groove and configured to roll along the length of the floor plate as the seat plate moves between the first and second end positions; and a second pair of scissor arms positioned between the floor plate and the seat plate and parallel with the first pair of scissor arms, the second pair of scissor arms having a first arm having an end rotatably supporting a second scroll wheel and a second gear, the second gear being operably coupled to the second rack and the second scroll wheel being engaged with the second guide groove and configured to roll along the length of the floor plate as the seat plate moves between the first and second end positions, wherein the first and second scroll wheels are configured to bear a weight of the first and second pairs of scissor arms, the seat plate, and the back plate.

12. A bathtub lift, comprising:

a floor plate;

a seat plate;

a back plate detachably coupled to the seat plate and configured to detach from the seat plate only when the seat plate is in a first end position closest to the floor plate; and a driven adjustment device configured for adjusting a vertical spacing between the floor plate and the seat plate, wherein the seat plate is configured to move relative to the floor plate via the driven adjustment device between the first end position and a second end position, in which the seat plate is furthest from the floor plate, wherein the driven adjustment device includes:

an electric motor supported on the back plate;

a pair of position-variable racks arranged parallel with one another; and a plurality of toothed gears rotatably supported in the backrest and operably coupled between the electric motor and the pair of position-variable racks.

13. The bathtub lift according to claim 12, wherein the pair of position-variable racks are parallel with the back plate, located rearwardly of the back plate, and supported on the floor plate.

14. The bathtub lift according to claim 12, further comprising:

a first pair of scissor arms positioned between the floor plate and the seat plate; and a second pair of scissor arms positioned between the floor plate and the seat plate and parallel with the first pair of scissor arms, wherein the first and second pairs of scissor arms are configured to support a weight of the back plate and the seat plate during movement of the seat plate between the first and second end positions.

* * * * *